(12) United States Patent
Matthews et al.

(10) Patent No.: US 9,467,522 B2
(45) Date of Patent: Oct. 11, 2016

(54) INGRESS BASED HEADROOM BUFFERING FOR SWITCH ARCHITECTURES

(71) Applicant: Broadcom Corporation, Irvine, CA (US)

(72) Inventors: William Brad Matthews, San Jose, CA (US); Bruce Hui Kwan, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 339 days.

(21) Appl. No.: 14/040,556

(22) Filed: Sep. 27, 2013

(65) Prior Publication Data

US 2015/0026361 A1   Jan. 22, 2015

Related U.S. Application Data

(60) Provisional application No. 61/856,386, filed on Jul. 19, 2013.

(51) Int. Cl.
| | |
|---|---|
| *H04L 29/08* | (2006.01) |
| *H04L 12/801* | (2013.01) |
| *H04L 12/825* | (2013.01) |
| *H04L 12/835* | (2013.01) |
| *H04L 12/823* | (2013.01) |
| *H04L 12/931* | (2013.01) |

(52) U.S. Cl.
CPC ............ *H04L 67/28* (2013.01); *H04L 47/11* (2013.01); *H04L 47/12* (2013.01); *H04L 47/26* (2013.01); *H04L 47/30* (2013.01); *H04L 47/32* (2013.01); *H04L 49/00* (2013.01)

(58) Field of Classification Search
CPC ........ H04L 47/32; H04L 47/30; H04L 43/16
See application file for complete search history.

(56) References Cited

U.S. PATENT DOCUMENTS

| | | | | |
|---|---|---|---|---|
| 6,147,969 A * | 11/2000 | Benmohamed | ......... | H04L 47/10 370/230 |
| 6,657,962 B1 * | 12/2003 | Barri | ...................... | H04L 47/10 370/235 |
| 7,224,691 B1 * | 5/2007 | Yeluri | .................... | H04L 47/22 370/394 |
| 7,672,235 B1 * | 3/2010 | Lian | ........................ | H04L 12/66 370/230 |
| 7,769,016 B1 * | 8/2010 | Yeluri | .................... | H04L 47/22 370/394 |
| 8,121,035 B2 * | 2/2012 | Oh | .......................... | H04L 49/90 370/235 |
| 8,520,522 B1 * | 8/2013 | Goldman | ..................... | 370/235 |

(Continued)

*Primary Examiner* — Philip Chea
*Assistant Examiner* — Wuji Chen
(74) *Attorney, Agent, or Firm* — Brinks Gilson & Lione (57) ABSTRACT

A network device performs ingress based headroom buffering. The network device may be configured as an output queue switch and include a main packet buffer that stores packet data according to a destination egress port. The network device may implement one or more ingress buffers associated with ingress data ports in the network device. The ingress buffers may be separate from the main packet buffer. The network device may identify a flow control condition triggered by an ingress data port, such as when an amount of data stored in the main packet buffer received through the ingress data port exceeds a fill threshold. In response, the network device may send a flow control message to a link partner to cease sending network traffic through the ingress data port. The network device may store in-flight data from the link partner in an ingress buffer instead of the main packet buffer.

22 Claims, 4 Drawing Sheets

(56) References Cited

U.S. PATENT DOCUMENTS

| | | | | |
|---|---|---|---|---|
| 8,665,892 B2* | 3/2014 | Lund | | H04L 49/205 370/230 |
| 8,712,883 B1* | 4/2014 | Yang | | H04L 12/14 375/240 |
| 2002/0085578 A1* | 7/2002 | Dell | | H04Q 11/0478 370/422 |
| 2003/0126280 A1* | 7/2003 | Yao | | H04L 47/10 709/234 |
| 2006/0187924 A1* | 8/2006 | Yu | | H04L 47/10 370/389 |
| 2007/0094405 A1* | 4/2007 | Zhang | | H04N 7/17318 709/231 |
| 2007/0280277 A1* | 12/2007 | Lund | | H04L 49/205 370/412 |
| 2009/0198907 A1* | 8/2009 | Speight | | G06F 12/0862 711/137 |
| 2010/0332674 A1* | 12/2010 | van Gassel | | H04L 67/104 709/231 |
| 2011/0216648 A1* | 9/2011 | Mehrotra | | H04L 47/30 370/230 |
| 2012/0257501 A1* | 10/2012 | Kucharczyk | | H04L 47/30 370/235 |
| 2014/0169169 A1* | 6/2014 | Almog | | H04L 47/2441 370/235 |

* cited by examiner

INGRESS BASED HEADROOM BUFFERING FOR SWITCH ARCHITECTURES

CROSS REFERENCE TO RELATED APPLICATIONS

This application claims priority to provisional application Ser. No. 61/856,386, titled "Ingress Based Headroom Buffering For Switch Architectures," and filed Jul. 19, 2013, which is incorporated by reference in its entirety.

TECHNICAL FIELD

This disclosure relates to networking. This disclosure also relates to buffering network data, including headroom buffering using ingress buffers.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Efficiency improvements in processing and managing of network traffic in switching devices will help improve high speed data networks.

DETAILED DESCRIPTION

The methods, systems, and techniques described below efficiently implement headroom buffering in switching architectures. As described in greater detail below, headroom buffering may refer to buffering that a switching device may perform to ensure that packets are not dropped, even when an amount of packet data stored in a memory exceeds a threshold fill level. The headroom buffering described may apply to any type of packet flow, and in particular to packet flows that are flagged as, desired to be, or are otherwise characterized as lossless packet flows. Additional benefits are that a switching device may preserve chip space and consume less power by implementing ingress port based buffers for buffering packet data to ensure lossless frame delivery, as opposed to allocating portions of a main packet memory for buffering the packet data.

Figure 1:
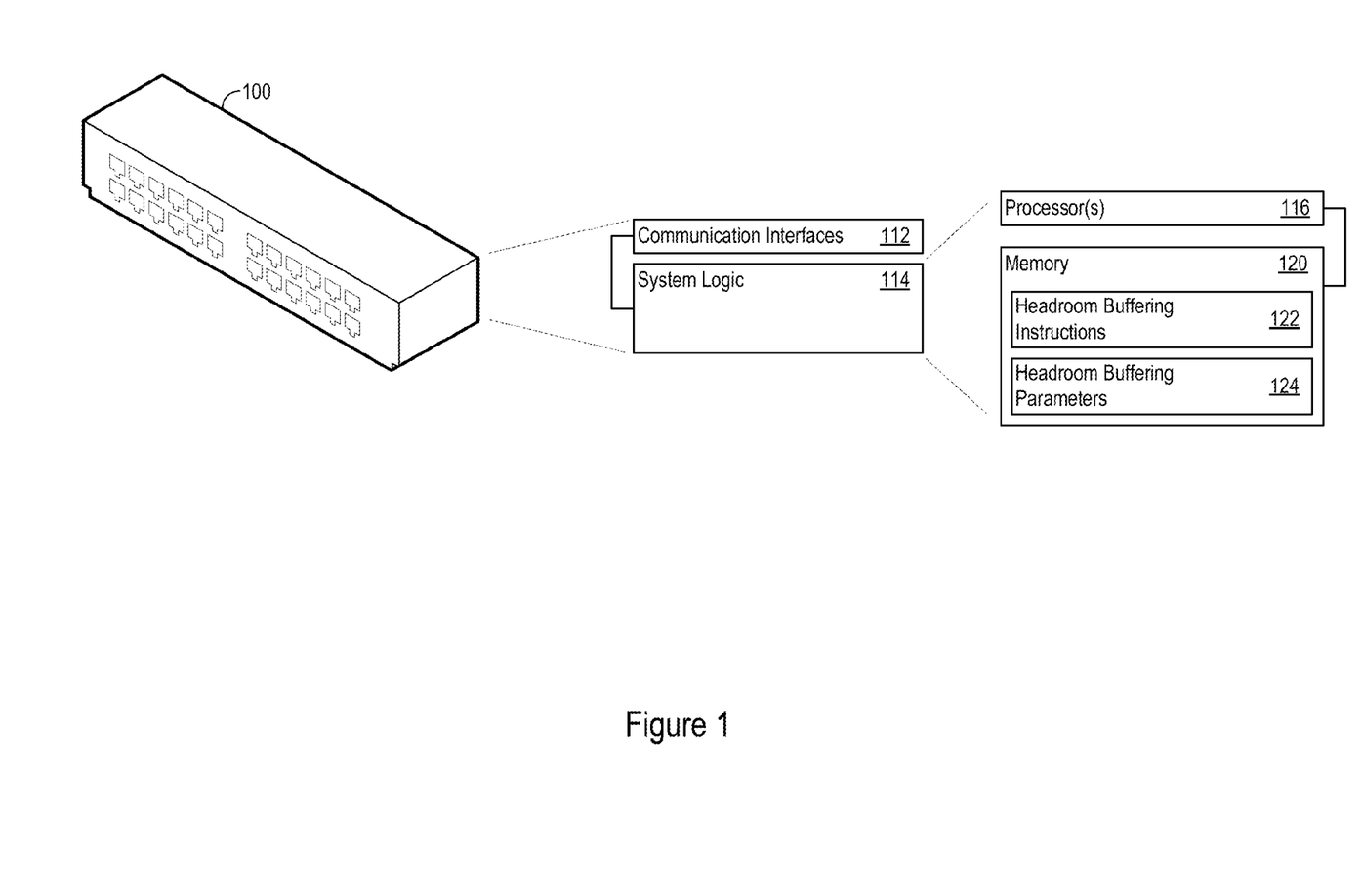
FIG. 1 shows an example of a network device that implements ingress based headroom buffering.

FIG. 1 shows an example of a network device 100 that implements ingress based headroom buffering. The network device 100 may be any device that communicates or routes data. In FIG. 1, the network device 100 is a switch, but the network device 100 may take any number of forms. As additional examples, the network device 100 may be a hub, router, gateway, network bridge, blade server, or any other type of network device that processes or routes network traffic such as packets.

The network device 100 includes a communication interface 112. The communication interface 112 may be configured to communicate according to one or more communication modes, e.g., according to various communication techniques, standards, protocols, or across various networks or topologies. The communication interface 112 may support communication according to particular quality-of-service (QoS) techniques, encoding formats, through various physical (PHY) interfaces, and more. For example, the communication interface 112 may communicate according to any of the following network wired technologies, topologies, mediums, or standards: Ethernet, cable (e.g. DOCSIS), DSL, Multimedia over Coax Alliance (MoCA), power line (e.g. HomePlug AV), Ethernet Passive Optical Network (EPON), and Gigabit Passive Optical Network (GPON). In that regard, the communication interface 112 may include multiple data ports, which may receive and send data to linked devices. In some implementations, the communication interface 112 may support wireless communications as well, including communication through any number of cellular standards (e.g., 2G, 3G, Universal Mobile Telecommunications System (UMTS), GSM (R) Association, Long Term Evolution (LTE) (TM), or more), WiFi (including 802.11 a/b/g/n/ac), WiMAX, Bluetooth, WiGig (e.g., 802.11ad), and more.

The network device 100 includes system logic 114. The system logic 114 may include any combination of hardware, software, firmware, or other logic. The system logic 114 may be implemented, for example, in a system on a chip (SoC), application specific integrated circuit (ASIC), or other circuitry. The system logic 114 is part of the implementation of any desired functionality in the network device 100. In that regard, the system logic 114 may include logic that facilitates, as examples, running applications; saving and retrieving application data; receiving, processing, and routing packet data; and establishing, maintaining, and terminating network connections.

The system logic 114 may include one or more processors 116 and memories 120. The memory 120 stores, for example, headroom buffering instructions 122 that the processor 120 executes to implement headroom buffering in the network device 100. The memory may also store headroom buffering parameters 124, which may specify any parameters, configurations, or other criteria for implementing the headroom buffering in the network device 100.

The network device 100 may support lossless frame delivery. For example, the network device 100 may ensure that packet data of one or more specified (e.g., lossless) traffic classes are not dropped or discarded by the network device 100. To support lossless frame delivery, the system logic 114 may reserve some amount of memory for preventing a memory overflow that causes packet drops. This reserved memory may be referred to as headroom or headroom memory. The network device 100 may also use the headroom memory to support some lossy traffic classes. In some implementations, the network device 100 implements headroom memory to support at least one lossless traffic class and at least one lossy traffic class, providing prioritized access to the headroom memory to the supported lossless traffic class over the supported lossy traffic class.

The system logic 114 may allocate a sufficient amount of headroom memory to ensure storage of network traffic received during a specified time period. For example, the system logic 114 may allocate enough space as headroom memory to prevent dropping of network traffic received during a flow control time period spanning from when the network device 100 detects a flow control condition (or other configurable triggering condition) to when the network device 100 ceases receiving network traffic from the link partner, e.g., as a result of the link partner receiving a flow control message or pause frame sent by the network device 100. In allocating headroom memory, the system logic 114 may account for any combination of delays that may occur before the link partner ceases sending network traffic to the network device 100. As one example, the system logic 114 may account for a flow control transmission delay, which may include the time required to detect a flow control condition or imminent memory overflow condition, generate the flow control message, and send the generated flow control message to a proper communication interface for transmission. As another example, the system logic 114 may account for a propagation delay, which may include the time required for a transmitted flow control message to reach a communication interface of the link partner, e.g., wire delay. As yet another example, the system logic 114 may account for a receiver response delay, which may include the time required for the link partner to process a received flow control message and halt transmission of network traffic to the network device 100.

The system logic 114 may perform headroom buffering by storing in-flight network traffic in the headroom memory. In-flight network traffic may refer to network traffic sent by a link partner to the network device 100 during a flow control time period. The start and end of the time period may be determined in different ways that depend on the particular implementation. As one example, the time period may span from when the network device 100 detects a flow control condition to when the network device 100 ceases receiving network traffic from the link partner. In that regard, the system logic 114 may ensure lossless frame delivery by storing in-flight network traffic in the headroom memory during the flow control time period.

Figure 2:
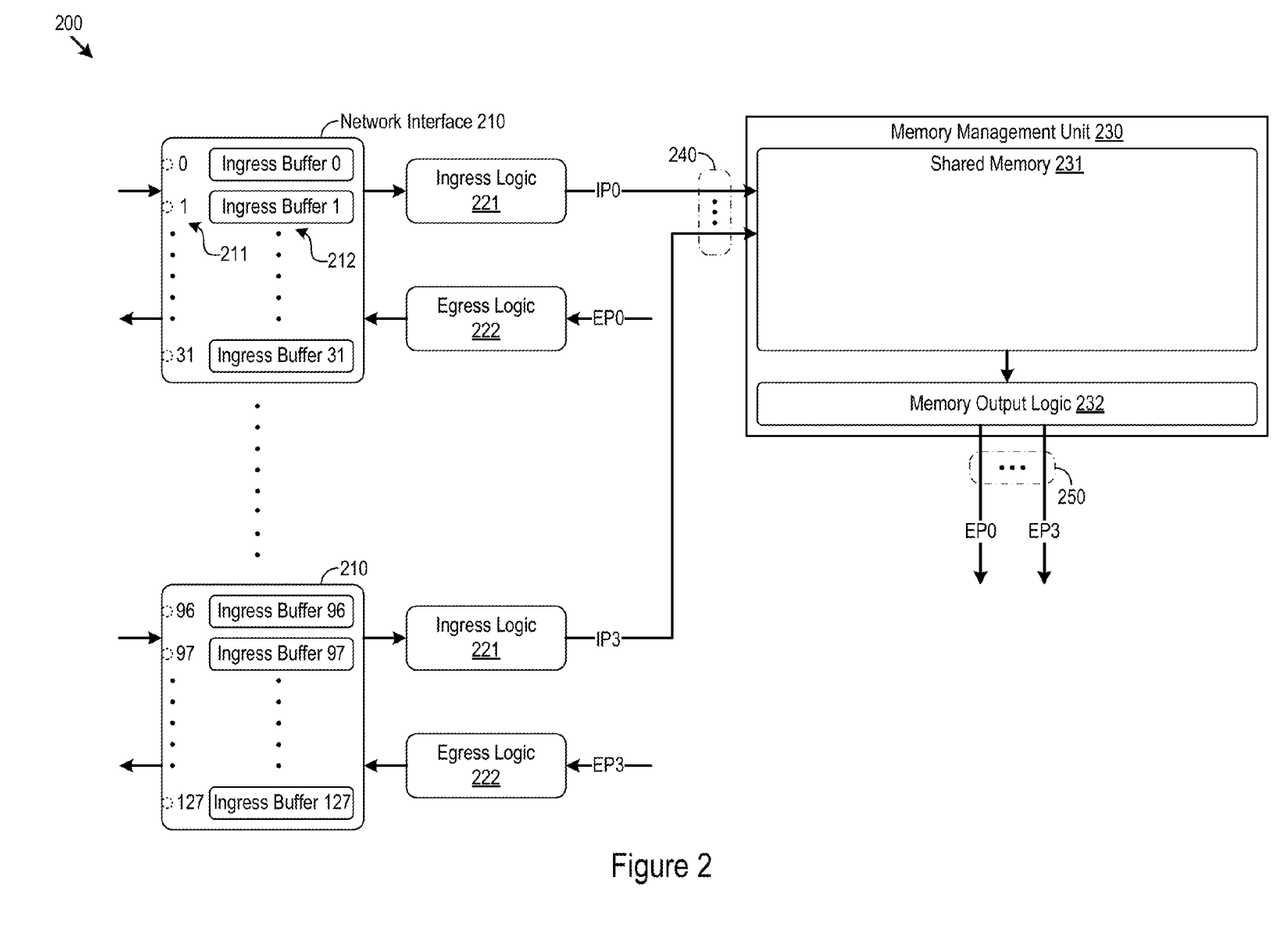
FIG. 2 is an example of a switch architecture that implements ingress based headroom buffering.

FIG. 2 shows an example of a switch architecture 200 that implements ingress based headroom buffering. The network device 100 may implement the switch architecture 200 for performing headroom buffering using one or more ingress headroom buffers.

The exemplary switch architecture 200 shown in FIG. 2 includes packet processing logic, including processing logic for handling packet ingress and packet egress. Packets, sent for example by source network devices such as a link partner, arrive at the network interfaces 210. The network interfaces 210 may include any number of physical data ports 211. In FIG. 2, each of the network interfaces 210 include 32 physical data ports. In other implementations, the network interfaces 210 may include more, less, or the same number of physical data ports. Each port may provide a physical interface to other networks or network devices, such as through a physical network cable (e.g., an Ethernet cable). Furthermore, each port may have its own line rate (i.e., the rate at which packets are received and/or sent on the physical interface). For example, the line rates may be 10 Mbps, 100 Mbps, 1 Gbps, 100 Gbps, or any other line rate. A data port may include data port logic that may, for example, support forwarding of packets to subsequent processing logic (e.g., the ingress logic 221) and storing in a packet memory or support buffering of incoming packets (e.g., to an associated ingress buffer).

The network interfaces 210 may include any number of ingress buffers 212, such as the ingress buffers labeled as ingress buffer 0, ingress buffer 1, and ingress buffer 31 in FIG. 2. The network interfaces 210 may implement ingress buffers 212 on per-port basis. Put another way, the network device 100 may allocate an ingress buffer for each physical data port in the network interfaces 210. As other options, the network interfaces 210 may implement multiple ingress buffers for a single physical data port or a single ingress buffer for multiple physical data ports. The system logic 114 may allocate all of or a portion of an ingress buffer as headroom memory for an ingress port associated with the ingress buffer. For example, the system logic 14 may configure the ingress buffers 212 as dedicated headroom buffers. Or, the system logic 114 may allocate a first portion of an ingress buffer for headroom buffering and a second portion of the ingress buffer for other ingress functionality, e.g., as an oversubscription buffer. In particular, the system logic 114 may allocate headroom buffering memory in the ingress buffers 212 instead of allocating the headroom buffering memory as apportion of a main packet memory, such as the shared memory 231.

The architecture 200 includes ingress logic 221, which may include any combination of processing hardware or software for handling packet ingress. For example, the ingress logic 221 may include one more packet processors or implement a packet processing pipeline for processing packets received through the network interfaces 210. The architecture 200 also includes egress logic 222, which may include any combination of processing hardware or software for handling packet egress. The ingress logic 221 and/or egress logic 221 may be associated with a set of data ports 211. In the exemplary architecture 200, sets of 32 data ports are associated with a respective network interface 210, ingress logic 221, and egress logic 222. The ingress logic 221 may forward processed packets for the associated set of data ports through an ingress pipe, such as the ingress pipe labeled as IP0. In a similar manner, the egress logic 222 may receive packets communicated through an egress pipe, such as the egress pipe labeled as EP0, for communication through the set of data ports associated with an egress pipe.

The switch architecture 200 includes a memory management unit (MMU) 230. The MMU 230 may include a shared memory 231, memory output logic 232, and other control logic. The MMU 230 receives processed packets from ingress pipes 240, which in the architecture 200 includes ingress pipes IP0-IP3. The MMU 230 maintains the shared memory 231, which may serve as a primary packet buffer for the network device 100. In that regard, the MMU 230 may store packets processed by the ingress logic 221 in the shared memory 231. The shared memory 231 may implement a packet buffer shared across multiple ingress pipes and egress pipes. For example, system logic 114 may use the shared memory 231 as packet memory to store processed packets sourced from the multiple data ports in the network device 100.

The switch architecture 200 may implement an output-queued switch in the following sense. In the switch architecture 200, the MMU 230 may store network traffic in the shared memory 231 according to destination egress ports. Put another way, the MMU 230 may store packets in the shared memory 231 based on the destination egress port for each packet. For example, the shared memory 231 may include one or more queues configured according to destination egress ports, where a particular queue in the shared memory 231 stores packets destined for communication through a particular egress port or set of egress ports. The shared memory 231 may include multiple queues for each egress port that, for example, store network traffic for according to varying traffic classes or priorities.

In some implementations, the ingress logic 221 maps incoming packets from input ports to destination egress ports. The mapping may include, as examples, analyzing address information in the packet headers, and performing a lookup in a mapping table that matches addressee information to destination egress port(s). The MMU 230 receives the processed packets from the ingress logic 221 through a respective ingress pipe and stores the processing packets according to the destination egress port(s).

The MMU 230 includes memory output logic 232. The memory output logic 232 may determine output ordering for packets stored in the shared memory 231. For example, the memory output logic 232 may determine a dequeue ordering according to which to retrieve packets from the shared memory 231 to output to the egress pipelines 250 for processing by the egress logic 222 and output through the network interfaces 210.

In operation, the system logic 114 monitors the shared memory 231 to determine a flow control condition. The flow control conditions may apply to or be triggered by particular data port(s), and the system logic 114 may configure different flow control conditions for different data ports in the network device 100. The headroom buffering parameters 124 may specify one or more flow control conditions, and some exemplary flow control conditions are presented next.

As one example, the system logic 114 may determine a flow control condition when a fill level of the shared memory 231 exceeds a threshold amount specified by a fill threshold. The system logic 114 may determine a fill threshold of the shared memory 213 as a particular fill percentage of the shared memory 231, a particular data amount or particular number of packets stored in the shared memory 231, or according to any other metric for specifying a fill level of the shared memory 321.

The system logic 114 may specify a fill threshold specific to one or more data ports in the network device 100. In that regard, the system logic 114 may allocate a proportion of the shared memory 231 for storing packet data received through a particular source data port (e.g., ingress port). When the amount of packet data received by the particular source data port and stored in the shared memory 321 exceeds the fill threshold for the particular source data port, the system logic 114 may determine a flow control condition triggered by the particular source data port.

The system logic 114 may determine a fill threshold value that accounts for a processing capability of a packet processing pipeline in the network device 100. For example, the system logic 114 may determine a fill threshold for a source data port that accounts for the amount of data from a source data port that the packet processing pipeline can process at a given time, such as maximum allocated packet processing amount for the source data port. To illustrate, the system logic 114 or the headroom buffering parameters 124 may allocate a particular amount of space in the shared memory 321 for storing packet data received from the source data port, e.g., 10 Megabytes (Mb) as one example. The packet processing pipeline, such as a pipeline in the ingress logic 22, may store or process a maximum of 0.1 Mb of packet data from source data port at a given time. Put another way, a maximum of 0.1 MB of packet data from the source data port may be present in the packet processing pipeline at a given time. In this example, the system logic 114 may determine the fill threshold for the source data port to be 9.9 Mb, e.g., the 10 Mb allocated amount of space for the source data port minus the 0.1 maximum packet processing amount of source data port packet data temporarily stored in or flowing through the pipeline. Continuing the example, the system logic 114 may determine a flow control condition when the amount of packet data received through the source data port and stored in the shared memory 231 exceeds 9.9 Mb, because the system logic 114 can reliably anticipate another 0.1 Mb incoming from the pipeline.

In some variations, the system logic 114 determines the fill threshold for a source data port as a static value. In other variations, the system logic 114 determines the fill threshold for a source data port as a dynamic value that may vary, for instance, according to a total fill level of the shared memory, fill level of the shared memory 231 for a particular set of a ports, or according to any number of other parameters as specified in the headroom buffering parameters 124.

In response to determining a flow control condition triggered by a source data port, the system logic 114 may perform headroom buffering to facilitate storing packets that belong to lossless traffic flows or supported lossy traffic flows, and avoid dropping any such packets. In that regard, the system logic 114 may send a flow control message, a pause frame, or other congestion notification to a link partner or source device linked to the network device 100 through the source data port. The system logic 114 may also send a headroom buffering indication to the source data port instructing the source data port to store incoming packet data into an associated ingress buffer instead of sending the incoming packet data through a packet processing pipeline for storing in the shared memory 231. After receiving the headroom buffering indication, the source data port may forego forwarding incoming in-flight packet data to subsequent packet processing logic such as associated ingress logic 221. Instead, the source data port may buffer the in-flight packet data into an associated ingress buffer. While the ingress buffers buffer incoming packets, the system logic 100 processes existing packet data in the memory 231. When fill levels in the shared memory 231 fall sufficiently below a resumption threshold, the system logic may send a resume message to the ingress logic 221 and/or data ports.

The source data port may selectively store received packet data into an associated ingress buffer. For instance, the source data port may store packet data belonging to a lossless traffic class into the ingress buffer, but discard (e.g., drop) packet data belonging to a lossy traffic class. Optionally, the source data port may store packet data for one or more lossy traffic classes into the packet buffer instead of dropping this packet data. In this way, the switch architecture 200 may perform ingress based headroom buffering by storing in-flight data in one or more ingress based buffers during a flow control time period.

Figure 3:
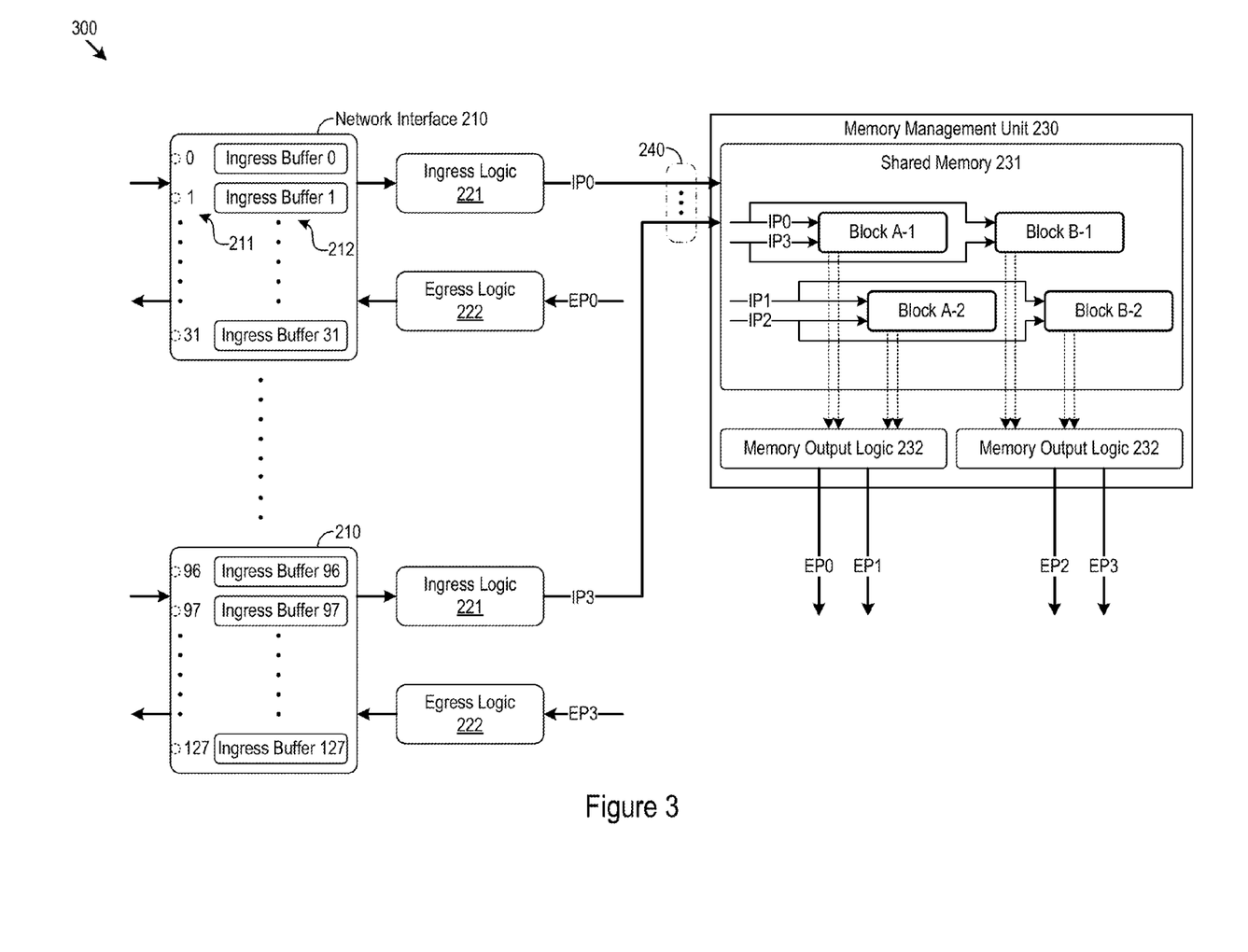
FIG. 3 shows another example of a switch architecture that implements ingress based headroom buffering.

FIG. 3 shows another example of a switching architecture 300 that implements ingress based headroom buffering. The network device 100 may implement the switch architecture 300 for performing headroom buffering using one or more ingress based headroom buffers.

The switching architecture 300 may implement a partitioned memory architecture in the shared memory 231 for storing packet data. The partitioned memory architecture shown in the exemplary architecture 300 may be referred to as a crosspoint architecture. In a crosspoint architecture, the shared memory 321 is egress partitioned. In the exemplary architecture 300, the network device 100 bifurcates the shared memory into two memory slices, and each memory slice is associated to a set of egress data ports. The set of egress data ports for each memory slice may not overlap. As seen in FIG. 3, the memory blocks labeled as block A-1 and A-2 form a memory slice associated with the set of egress data ports linked to egress pipes EP0 and EP1. The memory blocks labeled as B-1 and B-2 form a second memory slice in the shared memory 231 associated with the set of egress data ports linked to egress pipes EP2 and EP3. Each memory slice in the crosspoint architecture may include memory output logic 232 for handling outbound packets. Egress partitioning of the shared memory 231 may reduce a read bandwidth requirement for a packet and for MMU control structures, such as the memory output logic 232.

In the crosspoint architecture, the shared memory 231 is also ingress partitioned. Thus, may further partition each memory slice into multiple memory elements, e.g., blocks. In the architecture 300, the network device 100 bifurcates each of the memory slices into two memory blocks. The network device 100 associates a set of ingress data ports to each memory block, and as such, each memory block is associated with a particular set of ingress data ports and a particular set of egress data ports. In the architecture 300, memory block A-1 is associated with the set of ingress data ports linked to ingress pipes IP0 and IP3 as well as the set of egress data ports linked to egress pipes EP0 and EP1. Memory block B-1 is associated with the set of ingress data ports linked to ingress pipes IP0 and IP3 as well as the set of egress data ports linked to egress pipes EP2 and EP3, and so on.

In the crosspoint architecture, the MMU 230 stores packets according to destination egress port. Accordingly, the shared memory 231 stores a packet received from an ingress data port linked to ingress pipe IP0 based on whether the destination egress port for the packet is linked to egress pipes EP0 and EP1, whereupon the MMU 230 stores the packet in memory block A-1, or to egress pipes EP2 and EP3, whereupon the MMU 230 stores the packet in memory block A-2.

In the architecture 300, the network device 100 allocates headroom memory in the ingress buffers 212 instead of the shared memory 231. As the MMU 230 stores packets based on destination egress port, the system logic 114 may be unable to determine a destination egress port for in-flight data not yet received by the network device 100. Accordingly, the system logic 114 or MMU 230 may be unable to determine which memory block of the shared memory 231 that incoming in-flight data would be stored in. To ensure lossless frame delivery, the system logic 114 would have to reserve headroom memory in multiple memory blocks. To illustrate, the system logic 114 may determine to allocate headroom buffering to handle a flow control condition for a source data port linked to ingress pipe IP0. Were the system logic 114 to allocate the headroom memory in the shared memory 231, the system logic 114 would have to allocate sufficient headroom memory in both memory block A-1 and memory block A-2 to handle the worst-case scenario that all the in-flight data received by the source data port is directed to destination egress ports linked to EP0 and EP1, whereupon the MMU 230 would store all of the in-flight data in memory block A-1 or a similar scenario for storing all of the in-flight data in memory block B-1.

By allocating headroom memory in ingress based buffers instead of the shared memory 231 in the crosspoint switch architecture 300, the system logic 114 avoids duplicating headroom. In this way, the network device 100 may implement the shared memory 231 as a smaller size while supporting the same frameless delivery functionality, saving both chip area and reducing power consumption. Moreover, by implementing the ingress buffers 212 for headroom buffering, the network device 100 may use single data port memory, as opposed to costlier, more exotic memory that may be used to support high-bandwidth output queued switches, which may also reduce power consumption of the network device 100.

In operation, the system logic 114 monitors the shared memory 231 to determine a flow control condition. The system logic 114 may monitor for flow conditions on a per-memory block or per memory slice basis. For example, the flow control conditions may apply to particular data port(s), memory blocks, and/or memory slices. The system logic 114 may determine a fill threshold for packet data from a source data port stored in one or more memory blocks. In some implementations, the system logic 114 may determine a flow control condition when any memory block stores an amount of packet data from the source data port that exceeds a fill threshold.

Figure 4:
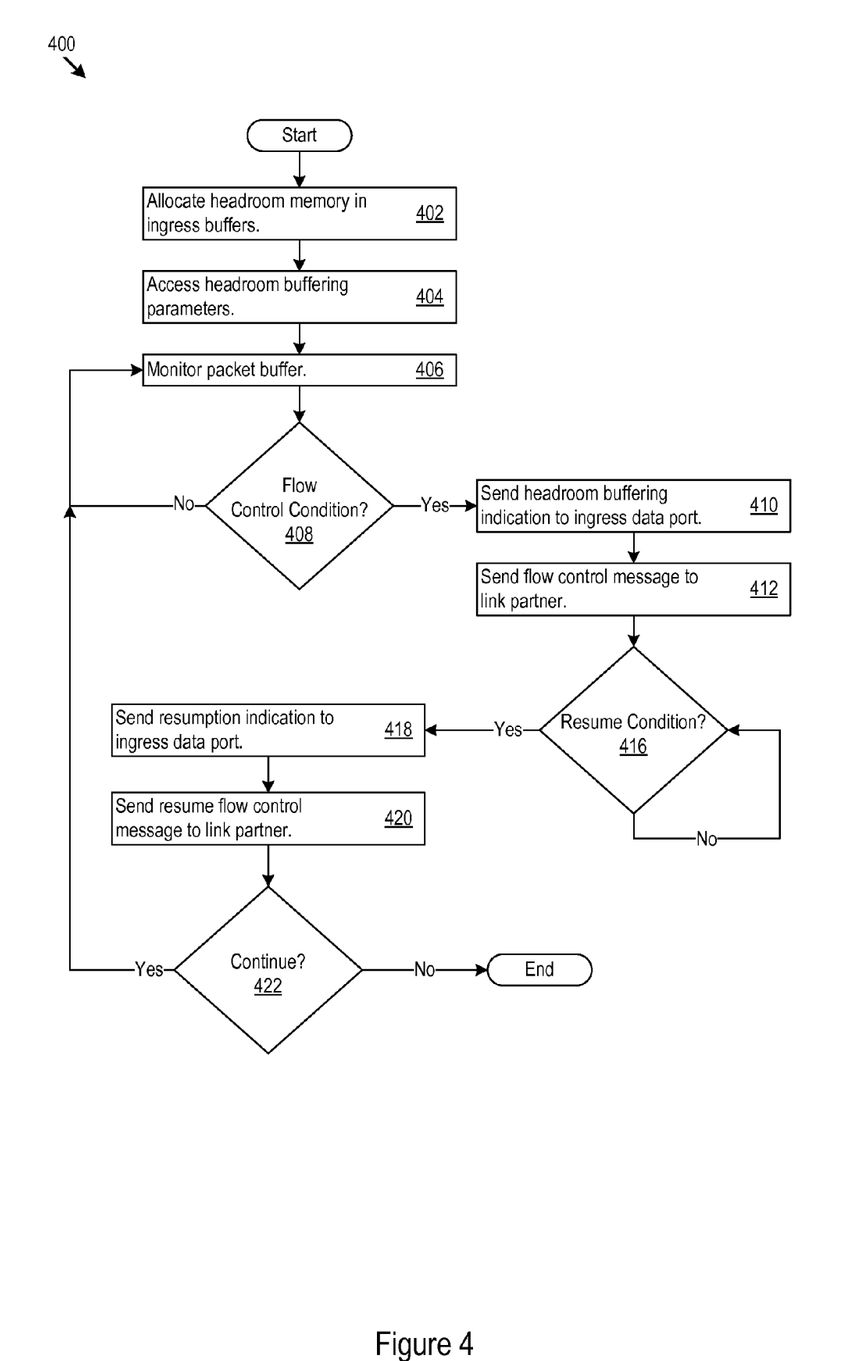
FIG. 4 shows an example of logic the network device may implement for performing ingress based headroom buffering.

FIG. 4 shows an example of logic 400 that a network device 100 may implement for performing ingress based headroom buffering. The system logic 114 may implement the logic 400 as any combination of hardware, software, or firmware. For example, the system logic 114 may implement the logic 400 in software as the headroom buffering instructions 122.

The system logic 114 allocates headroom memory in one or more ingress buffers (402). The network device 100 may implement the one or more ingress buffers as memories separate from a shared packet buffer, such as the shared memory 231. The system logic 114 may configure the packet buffer to store packets according to the destination egress port of the packet. In that regard, the network device 100 may be characterized as an output queue switch or a combination input-output queue switch. The network device 100 may implement a respective ingress buffer for each ingress data port in the network device 100 or, as another option, a respective ingress buffers for a group of ingress data ports in the network device 100. In allocating headroom memory in an ingress buffer, the system logic 114 may take account various delays that may occur during a headroom buffering process or when the system logic 114 handles a flow control condition for an ingress data port.

The system logic 114 may access the headroom buffering parameters 124 (404) and store packets into a packet buffer, while monitoring the packet buffer (406) according to the headroom buffering parameters. In particular, the system logic 114 may store packets arriving from the ingress pipelines in a primary memory space, and may monitor a main packet buffer or main packet memory of the network device 100, such as the shared memory 231 implemented in the MMU 230. The system logic 114 may determine when a flow control condition occurs (408), such as in any of the ways described above. The flow control condition may be triggered by a particular ingress data port. For example, the system logic 114 may determine when an amount of packet data received by the ingress data port and stored in the packet buffer has exceeded a fill threshold. In a crosspoint switch architecture such as the architecture 300, the system logic 114 may monitor some or all of the memory blocks partitioned in a packet buffer to determine whether a flow control condition has occurred. Also, the system logic 114 may continue to monitor a packet buffer for flow control conditions even while performing other headroom buffer related processing.

When the system logic 114 determines that a flow control condition has occurred, the system logic 114 may send a headroom buffering indication to the ingress data port that triggered the flow control condition (410). A data port may include port logic for processing packet data received or sent through the data port. In response to receiving the headroom buffering indication, the ingress data port may buffer incoming packet data in an ingress buffer instead of forwarding the incoming packet data for subsequent packet processing and storing in the main packet buffer. In particular, the ingress data port may selectively store incoming packet data, e.g., in-flight packet data communicated by a link partner prior to the link partner responding to a flow control message and ceasing communication of network traffic to the ingress data port. In selectively storing the incoming packet data, the ingress data port may store incoming packet data belonging to one or more specified traffic classes, e.g., lossless traffic classes. The ingress data port may drop incoming packet data not belonging to the one or more specified traffic classes, e.g., lossy traffic belonging to lossy traffic classes.

In some variations, the system logic 114 may selectively forward incoming packet data received through the ingress data port even after identifying a flow control condition triggered by the ingress data port. In the exemplary crosspoint architecture 300, the system logic 114 may selectively forward incoming packet data for storing in a memory block that has not exceeded a fill threshold of stored packet data from the ingress data port. To illustrate, in the switching architecture 300, the system logic 114 may detect a flow control condition when the stored packet data in memory block A-1 from the ingress data port exceeds a fill threshold for the ingress data port. In this example, the ingress data port may buffer incoming packet data in an ingress buffer when the incoming packet data would have been stored in memory block A-1, but forward incoming packet data for storing in memory block A-2. Port logic of the source data port may, for example, inspect incoming packets to determine an egress destination port, thus allowing the port logic to determine whether to buffer the incoming packet in the ingress buffer or forward the incoming packet for storing in memory block A-2. As another option, the port logic of the ingress data port may forward incoming packets to ingress logic 221 or other packet processing logic for determining an egress destination port. When the destination egress port corresponds to a first memory block for which the ingress data port triggered a flow control condition, the ingress logic 221 may return the incoming packet back to the ingress data port for buffering in an ingress buffer. When the destination egress port corresponds to a second memory block for which the ingress data port has not triggered a flow control condition, the ingress logic 221 may send the incoming packet to the MMU 230 for storing in the second memory block.

In response to determining occurrence of the flow control condition, the system logic 114 may send a flow control message to a link partner (412). In particular, the system logic 114 may send the flow control message to the link partner sending traffic to the network device 100 through the ingress data port triggering the flow control condition. The flow control message may instruct the link partner to pause or halt the sending of network traffic to the network device 100 through the ingress data port.

After identifying a flow control condition, the system logic 114 may monitor the packet buffer to determine a resume condition (416) for the ingress data port triggering the flow control condition. Through buffering in-flight data in an ingress buffer associated with the ingress data port and sending a flow control message to a link partner to cease communication through the ingress data port, the system logic 114 may limit the amount of packet data from the ingress data port being stored into the packet buffer. As the memory output logic 232 sends packet data through egress pipes for packet egress, the amount of packet data from the ingress data port stored in the packet buffer decreases. The system logic 114 may determine a resume condition when the amount of packet data from the ingress data port stored in the packet buffer falls below a particular fill level. The system logic 114 or headroom buffering parameters 124 may configure the resumption threshold to differ from the fill threshold by a minimum fill amount to prevent the system logic 114 from identifying a flow control condition shortly after identifying a resumption condition.

In response to identifying a resumption indication, the system logic 114 may send a resumption indication (418) to the ingress data port triggering the resumption indication (as well as a previous flow control condition). The system logic 114 may also send another flow control message (420) to a link partner linked to the network device 100 through the ingress data port. Specifically, the system logic 114 may send a resume flow control message indicating the link partner can resume sending network traffic to the ingress data port.

After receiving the resumption indication, the ingress data port may cease buffering incoming packet data in the ingress buffer. Instead, the ingress data port may forward incoming packet data for subsequent processing and storing in the packet buffer. Additionally, the ingress data port may forward the in-flight data, e.g., packets from one or more lossless traffic classes, buffered in the ingress buffer for subsequent processing and storing in the packet buffer as well. Thus, the ingress data port may empty the ingress buffer and ensure lossless frame delivery for the lossless traffic classes.

The system logic 114 may determine whether to continue (422). If so, the system logic 114 may continue to monitor the packet buffer for flow control conditions. While the discussion above for logic 400 primarily involved a process for ingress based headroom buffering in response to a flow control condition triggered by one ingress data port, the system logic 114 may continuously or simultaneously monitor the packet buffer and perform ingress based headroom buffering in response to multiple flow control conditions triggered by ingress source ports in the network device 100.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the network device 100 or system logic 114 may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

Various implementations have been specifically described. However, many other implementations are also possible.

What is claimed is:

1. A method comprising:
in a network device:
maintaining a packet buffer configured to store network traffic received through a first ingress port of a first network interface from over a network, and destined for an egress port;
determining that the network traffic stored in the packet buffer exceeds a fill threshold, and in response:
sending a headroom buffering indication to the first network interface; and
selectively allocating as additional buffer memory, by the first network interface, at least a portion of an ingress buffer allocated to the ingress port to store in-flight packet data not yet received from over the network by the first network interface, the ingress buffer being separate from the packet buffer and being allocated to store in-flight packet data instead of the packet buffer.

2. The method of claim 1, further comprising:
sending a flow control message over the network to a link partner linked to the network device through the first network interface, the flow control message instructing the link partner to stop communication through the first network interface.

3. The method of claim 2, further comprising:
determining that the network traffic stored in the packet buffer has fallen below a resumption fill level, and in response:
sending a resume flow control message to the link partner to resume communication through the first network interface.

4. The method of claim 1, further comprising, after sending the headroom buffering indication:
selectively storing the in-flight packet data received by the first network interface into the ingress buffer instead of forwarding the in-flight packet data to the packet buffer.

5. The method of claim 4, where selectively storing the in-flight packet data comprises:
storing a first packet belonging to a lossless traffic class; and
dropping a second packet belonging to a lossy traffic class.

6. The method of claim 1, further comprising:
determining that the packet data received by the first network interface and stored in the packet buffer has fallen below a resumption fill level, and in response:
sending a resumption indication to the first network interface to resume forwarding network traffic received by the first network interface to the packet buffer.

7. The method of claim 1, further comprising:
determining that the network traffic received by the first network interface and stored in the packet buffer has fallen below an resumption fill level, and in response:
forwarding the in-flight packet data stored in the ingress buffer to the packet buffer.

8. The method of claim 7, further comprising sending a resume flow control message over the network to a link partner to resume communication when an amount of in-flight packet data stored in the ingress buffer falls below an emptying threshold.

9. The method of claim 1, further comprising allocating a first portion of the ingress buffer for storing the in-flight data and a second portion of the ingress buffer for other ingress functionality.

10. The method of claim 1, where the fill threshold accounts for an amount of packet data from the ingress port that can be processed in a packet processing pipeline.

11. The method of claim 1, further comprising allocating a respective input buffer for multiple network interfaces in the network device.

12. A device comprising:
a packet memory configured to store network traffic received over a network, the network traffic stored according to destination data ports for the network traffic;
data port logic comprising:
a processor;
an ingress data port; and
a packet buffer associated with the ingress data port; and
where the data port logic is executable by the processor to forward network traffic received through the ingress data port for processing and storage in the packet buffer;
buffering logic executable by the processor to:
determine that an amount of the network traffic received through the ingress data port and stored in the packet buffer exceeds a threshold amount, and in response:
send a buffering indication to the data port logic; and
where the data port logic is further executable by the processor to, in response to receipt of the buffering indication, selectively allocate at least a portion of an input buffer as additional storage of network traffic and store subsequent network traffic received through the ingress data port into the allocated at least a portion of the input buffer instead of forwarding the subsequent network traffic for processing and storage in the packet buffer.

13. The device of claim 12, where the buffering logic is further operable to send a flow control message to a link partner linked to the data port, the flow control message instructing the link partner to stop sending data to the data port.

14. The device of claim 13, where the buffering logic is further operable to:
determine that the amount of network traffic received through the input port and stored in the packet buffer has fallen below a resumption fill level, and in response:
sending another flow control message to the link partner to resume communication.

15. The device of claim 12, where the data port logic is operable to store the subsequent network traffic by:
storing a first packet belonging to a lossless traffic class; and
dropping a second packet belonging to a lossy traffic class.

16. A device comprising:
a network interface configured to communicate across a network with a link partner, the network interface comprising a plurality of ingress ports; and
a distributed packet memory architecture comprising:
a primary packet memory comprising:

a first memory block configured to store packet data received through a first ingress port and destined for a first egress port;

a second memory block configured to store packet data received through the first ingress port and destined for a second egress port different from the first egress port; and an ingress buffer separate from the packet memory and allocated to the first ingress port; and system logic in communication with the packet memory and the ingress buffer, the system logic configured to:

selectively allocate a portion of the ingress buffer as additional memory space for inflight packet data not yet received from over a network at the first ingress port, an amount of the ingress buffer allocated as additional memory space instead of an allocation in the first memory block and second memory block.

17. The device of claim 16, where the system logic is further configured to:

determine a flow control condition triggered when an amount of packet data from the first ingress port stored in the first memory block exceeds a fill threshold, and in response:

send a flow control message to a link partner linked to the first ingress port to request cessation of sending packet data to the first ingress port.

18. The device of claim 17, where the system logic is further configured to:

selectively allocate by sending a buffer allocation request to the ingress buffer; and where the ingress buffer is configured to respond by:

selectively storing the in-flight data received from the link partner after sending the flow control message in the portion of the ingress buffer allocated as additional memory space.

19. The device of claim 18, where the system logic is configured to selectively store the in-flight data by:

receiving a packet; and storing the packet in the ingress buffer when the destination egress port for the packet is the first egress port; and forwarding the packet for processing and storing in the second memory block when the destination egress port for the packet is the second egress port.

20. The device of claim 18, where the system logic is configured to selectively store the in-flight data by:

storing a first packet that belongs to a lossless traffic class; and dropping a second packet that belongs to a lossy traffic class.

21. The device of claim 12, wherein the input buffer is allocated to the data port, and the data port logic is further executable by the processor to forward In flight data packets stored in the input buffer to the packet buffer for subsequent processing and storage in the packet buffer.

22. The device of claim 16, wherein the system logic is further configured to:

forward the packet data from the first ingress port to the ingress buffer, and from the ingress buffer to either the first memory block or the second memory block.

* * * * *